May 29, 1956  J. W. KECKLER  2,747,597
FUEL DROP TANK VALVE
Filed Oct. 29, 1951  2 Sheets-Sheet 2
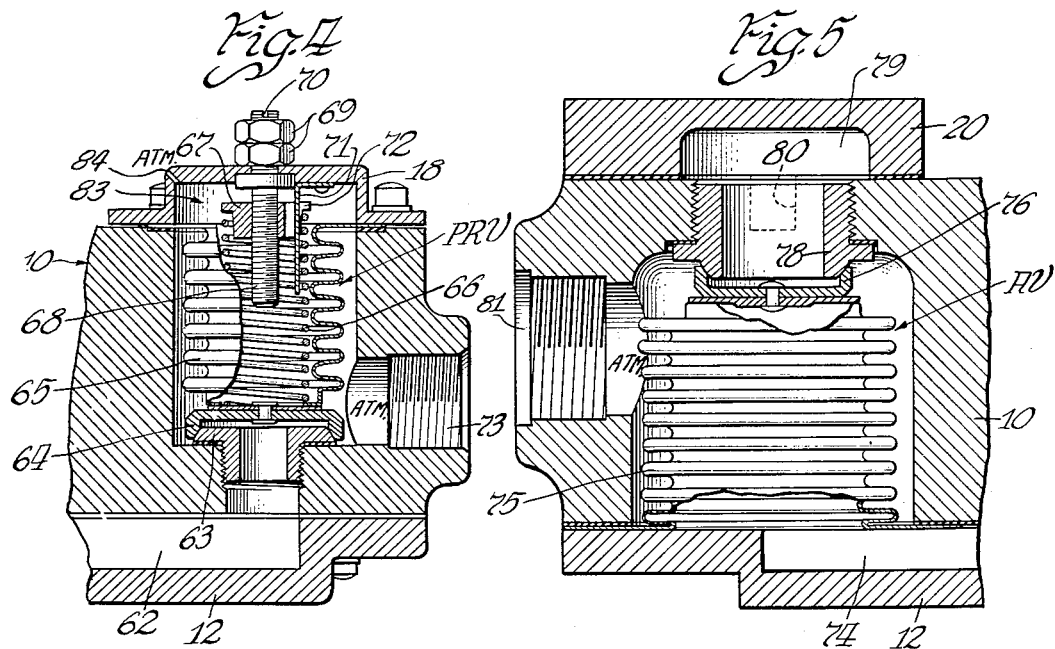
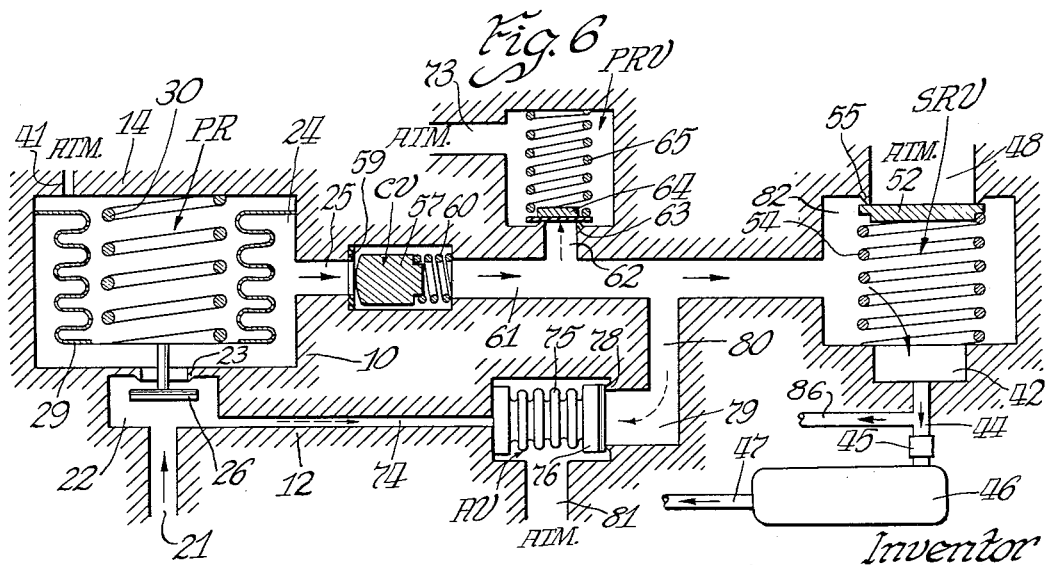
Inventor
John W. Keckler
by Bair, Freeman & Molinare
Attys.

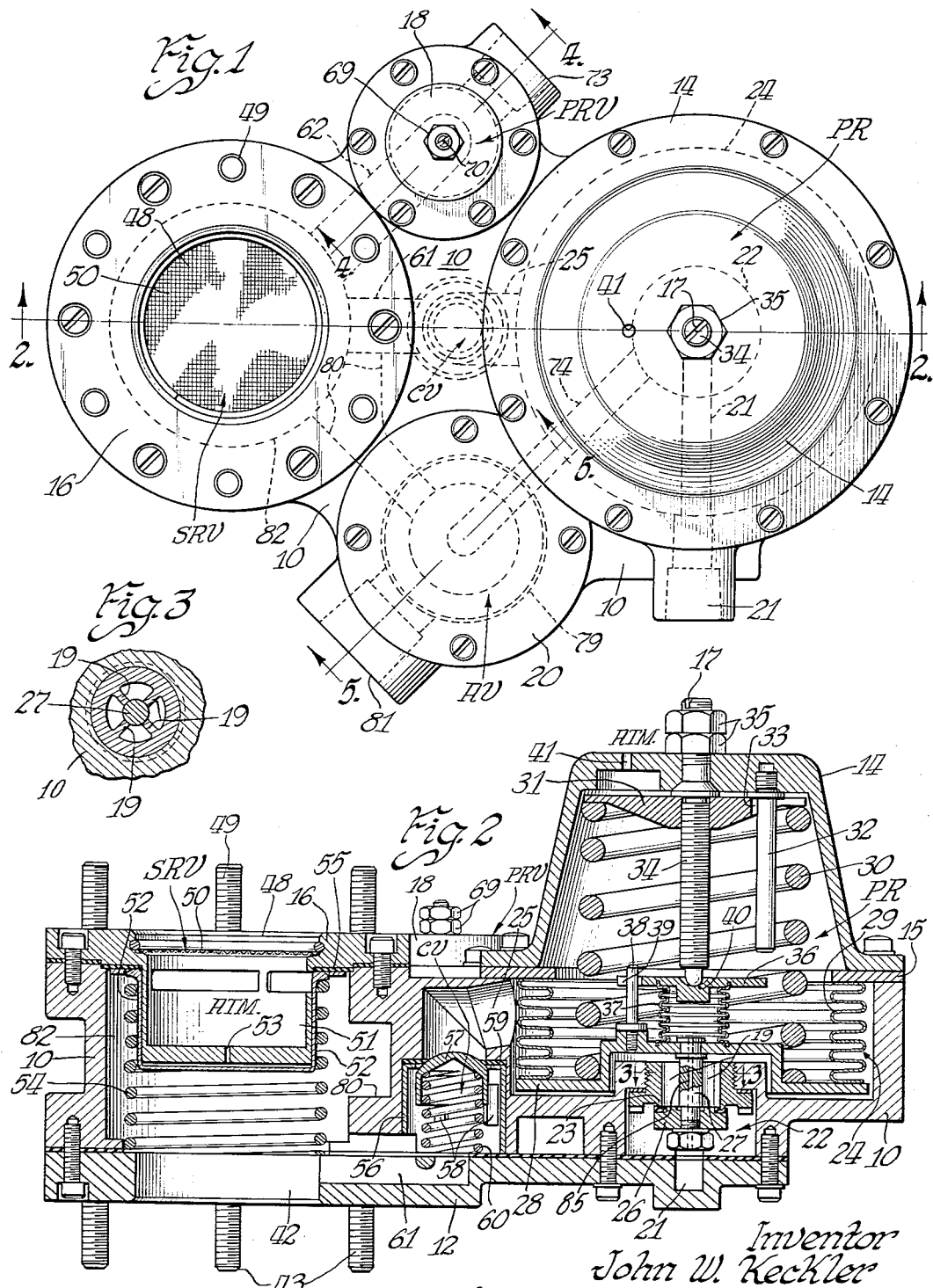

United States Patent Office 2,747,597
Patented May 29, 1956

2,747,597

FUEL DROP TANK VALVE

John W. Keckler, Bryan, Ohio, assignor to Aro Equipment Corporation, Bryan, Ohio, a corporation of Ohio Application October 29, 1951, Serial No. 253,734

6 Claims. (Cl. 137—107)

This invention relates to a specially constructed air valve particularly for aircraft use and designed particularly for use in connection with a fuel drop tank, although it may be used with other types of fuel tanks and also for a plurality of fuel tanks, one or more of which may be a drop tank.

One object of the invention is to provide a unitary valve structure for properly pressurizing the fuel tanks of aircraft or the like to increase the flow of fuel therefrom to the engine, and at the same time make provision within the valve structure for various emergency considerations and for proper pressurizing operation for the remaining fuel tanks (when pressurizing both the main and drop tanks) after a drop tank has been discarded.

Still another object is to provide a valve structure including a balanced type pressure regulator to which compressed air is supplied and which regulates the pressure of the air therefrom to the fuel tank for pressurizing the fuel therein at a substantially constant pressure, and to provide the valve structure with a check valve between the pressure regulator and the fuel tank, an automatic vent, a pressure relief valve and a suction relief valve, all for specific purposes which will hereinafter appear.

A further object is to provide a check valve to prevent any back flow of fuel from the tank to the air compressor in case the air pressure fails and the tank is at such an attitude that it can drain back through the pressure regulator or when other conditions occur that might permit the reverse flow of fuel through the pressure regulator to the compressed air inlet.

Still a further object is to provide a suction relief valve which functions when the demand for fuel is greater than the compressed air supply, this valve then opening to let air in from atmosphere to the fuel tank and thereby prevent a vacuum in the tank.

An additional object is to provide safety against pressure regulator failure by means of a pressure relief valve set slightly above the setting of the pressure regulator to relieve excess pressure from the compressed air inlet into the fuel tank by reason of an impaired pressure regulator.

A further additional object is to provide an automatic vent which, when the engine stops and thereby stops the air compressor, relieves the pressure from the fuel tank, the automatic vent being closed whenever the air compressor is operating but opening as soon as it stops operating.

Another additional object is to provide a pressurizing control unit including the various valves referred to, which control unit is interposed between the air compressor and the fuel tanks and is provided with the necessary vents to atmosphere to do the complete job required to pressurize them and provide for any emergency that might arise from malfunctioning of any of the parts of the pressurizing control unit.

With these and other objects in view, my invention consists in the construction, arrangement and combination of the various parts of my fuel drop tank valve, whereby the objects contemplated are attained, as hereinafter more fully set forth, pointed out in my claims and illustrated in the accompanying drawings, wherein:

Figure 1 is a plan view of a fuel drop tank valve embodying my invention.

Figure 2 is a sectional view thereof on the line 2—2 Figure 1, this section being taken through the pressure regulator and the suction relief valve.

Figure 3 is a detail sectional view on the line 3—3 of Figure 2.

Figure 4 is a sectional view on the line 4—4 of Figure 1 taken through the pressure relief valve.

Figure 5 is a sectional view on the line 5—5 of Figure 1 taken through the automatic vent; and Figure 6 is a diagrammatic view of a complete fuel pressurizing system resulting from the use of my valve structure and showing it connected with a fuel tank.

On the accompanying drawing I have used the following reference characters to indicate the main elements of my drop fuel tank valve:

PR—pressure regulator
CV—check valve
AV—automatic vent
PRV—pressure relief valve
SRV—suction relief valve My valve structure includes a valve body 10 in which the foregoing elements are located, a bottom plate 12 therefor and a plurality of cover members 14, 16, 18 and 20 for the pressure regulator, the suction relief valve, the pressure relief valve and the automatic vent respectively.

The pressure regulator PR (see Figure 2) is provided with a compressed air inlet 21 leading to an inlet chamber in which a valve seat 23 is located. An outlet chamber 24 communicates with the outlet side of the valve seat and is in communication with a passageway 25.

A valve disc 26 is adapted to seat on the seat 23 and is provided with a valve stem 27 which has guide wings 19 and the upper end of which terminates in a bellows head 28. A bellows 29 has its lower end sealed relative to the bellows head and its upper end sealed relative to an intermediate cover plate 15 between the cover plate 14 and the valve body 10. A spring 30 is interposed between the bellows head 28 and a spring seat 31 which spring seat is threaded on an adjusting screw 34 provided with lock nuts 35. The spring seat 31 has a slot 33 slidable on a guide pin 32 for preventing rotation of the spring seat when the lock nuts 35 are loosened and the adjusting screw 34 is rotated for adjustment purposes by means of a screw driver inserted in a slot 17 thereof.

The valve 26 is balanced by providing a bellows head 36 at the lower end of the adjusting screw 34 having a depression 40 for this lower end to seat in and a balance bellows 37 inteprosed between the heads 28 and 36. The bellows 37 has an effective area equal to the diameter of the valve seat 23 and its interior communicates with the chamber 22 by means of a passageway 85 through the valve stem 27. Thus the valve 23–26 is balanced regardless of any variations in pressure in the inlet 21. Rotation of the head 36 is prevented by a guide pin 38 and a slot 39 in the head which coact with each other in an obvious manner. The pressure regulator cover 14 is also provided with a vent 41 to atmosphere which communicates with the interior of the bellows 29 and the exterior of the seal bellows 37.

Returning to Figure 2, the suction relief valve SRV has an inlet 48 from atmosphere and the cover plate 16 is provided with studs 49 for connection to the flange of a suitable conduit (not shown) leading from atmosphere such as outside the body of the plane. A screen 50 is provided to prevent the entrance of foreign matter into the suction relief valve and the cover plate 16 is provided with a valve cage 51 over which a valve cup 52 is slidable. A spring 54 normally seats the upper peripheral edge of the valve cup 52 against a gasket-like valve seat 55. A vent 53 permits relatively free action of the valve cup 52 with relation to the valve cage 51 over which it slides, the vent being sufficiently restricted to slow the motion of the valve cup so that it is not too violent in action in response to pressure changes. The parts 51, 52 and 54 are located in a chamber 82 of the suction relief valve.

The suction relief valve SRV has an outlet 42 from the chamber 82 to which a flange of a conduit 44 may be connected by means of the studs 43. The conduit 44 is shown diagrammatically in Figure 6 leading through a coupling 45 on the conduit (which automatically closes relative to the conduit and thereby the valve body outlet 42 when uncoupled) to a drop fuel tank 46. A conduit 47 from the tank 46 leads to the fuel pump that supplies fuel to the engine. A branch conduit 86 leads from the conduit 44 to a main fuel tank (not shown). In actual practice there is usually a plurality of main tanks and a plurality of drop tanks, one automatic coupling 45 being provided for each drop tank.

The check valve CV is located in a sleeve 56 of the valve body 10 and comprises a valve plug 57 adapted to be seated against a gasket-like valve seat 59 by a spring 60. The valve plug has three guide wings 58 slidable along the interior wall of the sleeve 56, and the inlet side of the valve seat 59 communicates with the passageway 25 while the outlet side thereof communicates with a passageway 61 leading to the outlet 42 to the fuel tank.

The pressure relief valve PRV shown in Figure 4 communicates with the outlet 61 from the check CV by means of a passageway 62 communicating with the outlet 42 to the tanks to which the passageway 61 leads. Communicating with the passageway 62 is a valve seat 63 against which a valve disc 64 is normally seated by a spring 66. A bellows 65 has its lower end secured to the valve disc 64 and its upper end sealed under the pressure relief valve cover 18 to seal off communication between the outlet 73 to atmosphere and the space 83 around and an adjusting screw 68 for the spring 66. The space 83 is vented to atmosphere at 84.

The adjusting screw 68 is threaded in a spring follower 67 and rotation of the spring follower is prevented by an arm 71 secured to the cover 18 and located in a slot 72 of the spring follower. Lock nuts 69 are provided for the adjusting screw 68 and a slot 70 permits the use of a screw driver for rotating the adjusting screw when the lock nuts 69 are loose. The exterior of the bellows 65 communicates with an outlet to atmosphere indicated at 73.

The automatic vent AV shown in Figure 5 is supplied with compressed air from the inlet chamber 22 of the pressure regulator PR through a passageway 74 leading from that chamber. The automatic vent includes a bellows 75, the interior of which is responsive to the pressure in the passageway 74. A valve disc 76 is carried by the bellows 75 and is normally open. It is closed when the fuel drop tank valve is in operation as in Figure 6. The interior of the valve seat 78 is in communication with a passageway 79 in the automatic vent cover 20 which in turn communicates with a passageway 80 in the valve body 10 leading from the chamber surrounding the suction relief valve spring 54 and which in turn communicates with the passageway 61 leading from the outlet of the check valve CV. The valve body 10 is provided with an outlet 81 to atmosphere which communicates with the exterior of the bellows 75.

My valve structure has three main outlets to atmosphere indicated as ATM. throughout the drawings. These are 48 (interior of 51) in Figure 2, 73 in Figure 4, 81 in Figure 5 and all three in Figure 6. The vents 53 (interior of 51) and 41 in Figure 2, 84 in Figure 4 and 41 in Figure 6 are also similarly indicated.

*Practical operation*

The compressed air supply of the airplane is connected to the compressed air inlet 21 so as to operate through the pressure regulator PR to reduce the pressure of the air fed from the compressor at anywhere between 12 and 80 p. s. i. down to about 5 p. s. i. if this is the desired pressure on the fuel in the fuel tanks in order to assist the fuel pumps in properly feeding the fuel to the engines.

The primary consideration for air from the pressure regulator into the tank is for pressurizing the fuel but many problems are involved so that more than a mere pressure regulator is required. It is desirable that provision be made in the form of the check valve CV to prevent any back flow of fuel from the tank to the air compressor for instance in case the air pressure fails and the tank is at such an attitude that it can drain back to the pressure regulator. Also if the demand for fuel is greater than the compressed air supply, the suction relief valve SRV is required in order to open and let air in from atmosphere to the tank to thus prevent a vacuum in the tank that would hinder the withdrawal of fuel from the tank by the fuel pump of the engine.

In case of pressure regulator failure, provision is made for pressure relief through the pressure relief valve PRV (which would be set slightly above the setting of the pressure regulator). Also when the engine stops and thereby stops the air compressor, it is desirable that the pressure be taken off the fuel tank and this is accomplished by the automatic vent AV, all in the manner to now be described.

Referring to Figure 6, the pressure of the compressed air at 21 acting on the bellows 29 tends to close the pressure regulator valve 23–26 after the pressure exceeds a predetermined value set by the adjusting screw 34. Thus while the pressure at 21 may be higher than that desired, the pressure in the passageway 25 to the check valve CV is the desired pressure for pressurizing the fuel tanks.

The compressed air at reduced pressure opens the check valve CV and flows through the passageway 61 into the chamber 82 of the suction relief valve SRV and from there through the elements 42, 44 and 45 to the fuel tanks for pressurizing the fuel therein at the setting of the pressure regulator PR. At the same time, the pressure in 21 acts on the bellows 75 of the automatic vent AV for closing it as shown so that the pressure from the check valve CV is not let back out to atmosphere at 81.

The check valve CV functions whenever the fuel tends to back up from the tanks through the passageway 61 and into the pressure regulator, closing at that time to prevent such reverse flow of fuel. In the event of pressure regulator failure, excess pressure from the line 21 is relieved to atmosphere through the pressure relief valve PRV which is set just slightly above the setting of the pressure regulator PR (such as 5½ p. s. i.).

When the engine stops or is inoperative, it is desirable to vent the fuel tank to atmosphere and this is accomplished automatically by means of the automatic vent AV and by reason of the pressure being reduced in the line 74 because it reduces back through the compressor to atmospheric in the valve body inlet 21. This permits the bellows 75 to collapse from the position of Figure 6 so that the valve disc 76 is spaced from the valve seat 78 and any air above atmospheric pressure in the automatic vent AV is thereupon relieved to atmosphere at 81.

From the foregoing description, it is obvious that I have provided a unitary valve structure having the necessary means therein to pressurize a fuel tank yet take care of any emergency or any malfunctioning of the parts thereof. When a fuel tank such as 46 is dropped, the automatic coupler 45 thereupon closes so that the valve structure can continue to operate for properly pressurizing the remaining fuel tanks.

Some changes may be made in the construction and arrangement of the parts of my fuel drop tank valve without departing from the real spirit and purpose of my invention, and it is my intention to cover by my claims any modified forms of structure or use of mechanical equivalents which may be reasonably included within their scope.

I claim as my invention:

1. In a valve for a fuel drop tank, a valve body having an inlet and an outlet, a pressure regulator in said valve body between said inlet and said outlet for reducing air pressure received in said inlet and feeding the reduced air pressure to said outlet, said outlet being adapted for connection with the fuel tank, a suction relief valve in said valve body between said presure regulator and said outlet and having an inlet from atmosphere, a valve disc normally seated on said last inlet and being subject externally to atmospheric pressure upon reduction of pressure in said valve body between said pressure regulator and said valve body outlet for opening when there is a vacuum therein to thereby permit flow of atmospheric air to said outlet, and an automatic vent in said valve body comprising a normally open valve, pressure means to close said valve, said pressure means being connected to said valve body inlet, and said valve being connected between the outlet of said pressure regulator and atmosphere to close communication between said last outlet and atmosphere when pressure is applied to said valve body inlet, and to open communication between said last outlet and atmosphere upon cessation of the application of pressure to said valve body inlet.

2. In a valve for a fuel drop tank, a valve body having an inlet and an outlet, a pressure regulator in said valve body between said inlet and said outlet for reducing air pressure received in said inlet and feeding the reduced air pressure to said outlet, said outlet being adapted for connection with the fuel tank, a suction relief valve in said valve body having an inlet from atmosphere, a valve disc normally seated on said last inlet and being subject to reduction of pressure in said valve body between said pressure regulator and said valve body outlet for opening when there is a vacuum therein to thereby permit flow of atmospheric air to said outlet, an automatic vent in said valve body comprising a normally open valve, pressure means to close said valve, said pressure means being connected to said valve body inlet and said valve being connected between the outlet of said pressure regulator and atmosphere to close communication between said last outlet and atmosphere when pressure is applied to said valve body inlet and to open communication between said last outlet and atmosphere upon cessation of the application of pressure to said valve body inlet, and a normally closed check valve in said valve body between said pressure regulator and said valve body outlet, said check valve opening in a direction from the outlet of said pressure regulator toward said valve body outlet.

3. In a valve for a fuel drop tank, a valve body having an inlet and an outlet, a pressure regulator in said valve body between said inlet and said outlet for reducing air pressure received in said inlet and feeding the reduced air pressure to said outlet, said outlet being adapted for connection with the fuel tank, a suction relief valve in said valve body having an inlet from atmosphere, a valve disc normally seated on said last inlet and being subject to reduction of pressure in said valve body between said pressure regulator and said valve body outlet for opening when there is a vacuum therein to thereby permit flow of atmospheric air to said outlet, an automatic vent in said valve body comprising a normally open valve, pressure means to close said valve, said pressure means being connected to said valve body inlet and said valve being connected between the outlet of said pressure regulator and atmosphere to close communication between said last outlet and atmosphere when pressure is applied to said valve body inlet and to open communication between said last outlet and atmosphere upon cessation of the application of pressure to said valve body inlet, and a pressure relief valve in said valve body having an outlet to atmosphere and having an inlet leading from said pressure regulator outlet.

4. In a valve for a fuel drop tank, a valve body having an inlet and an outlet, a pressure regulator in said valve body between said inlet and said outlet for reducing air pressure received in said inlet and feeding the reduced air presure to said outlet, said outlet being adapted for connection with the fuel tank, a suction relief valve in said valve body having an inlet from atmosphere, a valve disc normally seated on said last inlet and being subject to reduction of pressure in said valve body between said pressure regulator and said valve body outlet for opening when there is a vacuum therein to thereby permit flow of atmospheric air to said outlet, an automatic vent in said valve body comprising a normally open valve, pressure means to close said valve, said pressure means being connected to said valve body inlet and said valve being connected between the outlet of said pressure regulator and atmosphere to close communication between said last outlet and atmosphere when pressure is applied to said valve body inlet and to open communication between said last outlet and atmosphere upon cessation of the application of pressure to said valve body inlet, a normally closed check valve in said valve body between said pressure regulator and said valve body outlet, said check valve opening in a direction from the outlet of said pressure regulator toward said valve body outlet and a pressure relief valve in said valve body having an outlet to atmosphere and having an inlet leading from said pressure regulator outlet.

5. In a valve for a fuel drop tank, a valve body having an inlet and an outlet, a presure regulator in said valve body between said inlet and said outlet for reducing air pressure received in said inlet and feeding the reduced air pressure to said outlet, said outlet being adapted for connection with the fuel tank, an automatic vent in said valve body comprising a normally open valve, pressure means to close said valve, said pressure means being connected to said valve body inlet and said valve being connected between the outlet of said pressure regulator and atmosphere to close communication between said last outlet and atmosphere when pressure is applied to said valve body inlet and to open communication between said last outlet and atmosphere upon cessation of the application of pressure to said valve body inlet, and a pressure relief valve in said valve body having an outlet to atmosphere and having an inlet leading from said pressure regulator outlet.

6. In a valve for a fuel drop tank valve, a valve body having an inlet and an outlet, a pressure regulator in said valve body between said inlet and said outlet for reducing air pressure received in said inlet and feeding the reduced air pressure to said outlet, said outlet being adapted for connection with the fuel tank, an automatic vent in said valve body comprising a normally open valve, pressure means to close said valve, said pressure means being connected to said valve body inlet and said valve being connected between the outlet of said pressure regulator and atmosphere to close communication between said last outlet and atmosphere when pressure is applied to said valve body inlet and to open communication between said last outlet and atmosphere upon cessation of the application of pressure to said valve body inlet, a normally closed check valve in said valve body between said pressure regulator and said valve body outlet, said check valve opening in a direction from the outlet of said pressure regulator toward said valve body outlet, and a pressure relief valve in said valve body having an outlet to atmosphere and having an inlet leading from said pressure regulator outlet.

References Cited in the file of this patent

UNITED STATES PATENTS

| | | |
|---|---|---|
| 1,553,807 | Elliott | Sept. 15, 1925 |
| 2,088,685 | Birch | Aug. 3, 1937 |
| 2,308,583 | Borges | Jan. 19, 1943 |
| 2,389,413 | Carlton | Nov. 20, 1945 |
| 2,505,376 | Asselin | Apr. 25, 1950 |